United States Patent [19]
Gilbert, Jr. et al.

[11] 3,959,716

[45] May 25, 1976

[54] WIDE INPUT RANGE SWITCHING VOLTAGE REGULATOR

[75] Inventors: Gerard B. Gilbert, Jr., Baltimore; Robert E. McMorran, Timonium, both of Md.

[73] Assignee: The Bendix Corporation, Southfield, Mich.

[22] Filed: Aug. 14, 1975

[21] Appl. No.: 604,735

[52] U.S. Cl. .................................. 323/20; 323/17; 323/22 T
[51] Int. Cl.² ........................................ G05F 5/00
[58] Field of Search ......... 323/17, 22 T, 20, DIG. 1; 321/16, 18, 2

[56] References Cited
UNITED STATES PATENTS

| | | |
|---|---|---|
| 3,323,034 | 5/1967 | Dubin et al. ........................... 321/16 |
| 3,781,653 | 12/1973 | Marini ................................... 323/17 |
| 3,863,140 | 1/1975 | Easter et al. ....................... 323/20 X |
| 3,889,177 | 6/1975 | Fendrich, Jr. ........................... 323/17 |

*Primary Examiner*—Gerald Goldberg
*Attorney, Agent, or Firm*—W. G. Christoforo; Bruce L. Lamb

[57] ABSTRACT

A switching transistor connects an input terminal at which a wide range of voltage levels may be impressed with an output terminal at which a relatively constant voltage is desired. A charge storage circuit whose discharge frequency is controlled in accordance with the output voltage and discharges a further charge storage circuit operating in accordance with the input voltage level. The further charge storage circuit controls the ON-OFF state of the switching means. Switching transistor turn off transient energy is inductively coupled to the output terminal.

3 Claims, 2 Drawing Figures

WIDE INPUT RANGE SWITCHING VOLTAGE REGULATOR

BACKGROUND OF THE INVENTION

This invention relates to voltage regulators operable over a wide range of input voltages and which regulate an output voltage by variable cycle modulation of the input voltage.

The regulator basically comprises a transistor switching means connected between an unregulated input source and an output terminal at which a load is connectable. The switching means is switched on and off at a high frequency by a circuit comprised of a charge storage means operating in accordance with the input voltage level. This charge storage circuit is periodically discharged by an oscillatory circuit comprising another charge storage circuit operating in accordance with the output voltage. The resulting output of the switching means is integrated in a low pass filter circuit which includes the primary winding of a transformer to derive an average value which is the output voltage of the regulator. The transformer secondary winding is coupled to the output terminal through a unidirectional current element so that turn off transients of the switching means inductively couple energy by means of the transformer onto the output terminal to maintain the voltage thereat. The circuit is so designed that the duty cycle of the wave traversing the switching means is related to the input voltage while the pulse rate of the rectangular wave is related to the output regulated voltage.

The purpose of the invention is to provide a regulated voltage given an unregulated voltage which can vary over an extremely wide range.

DESCRIPTION OF THE PREFERRED EMBODIMENT

Figure 1:
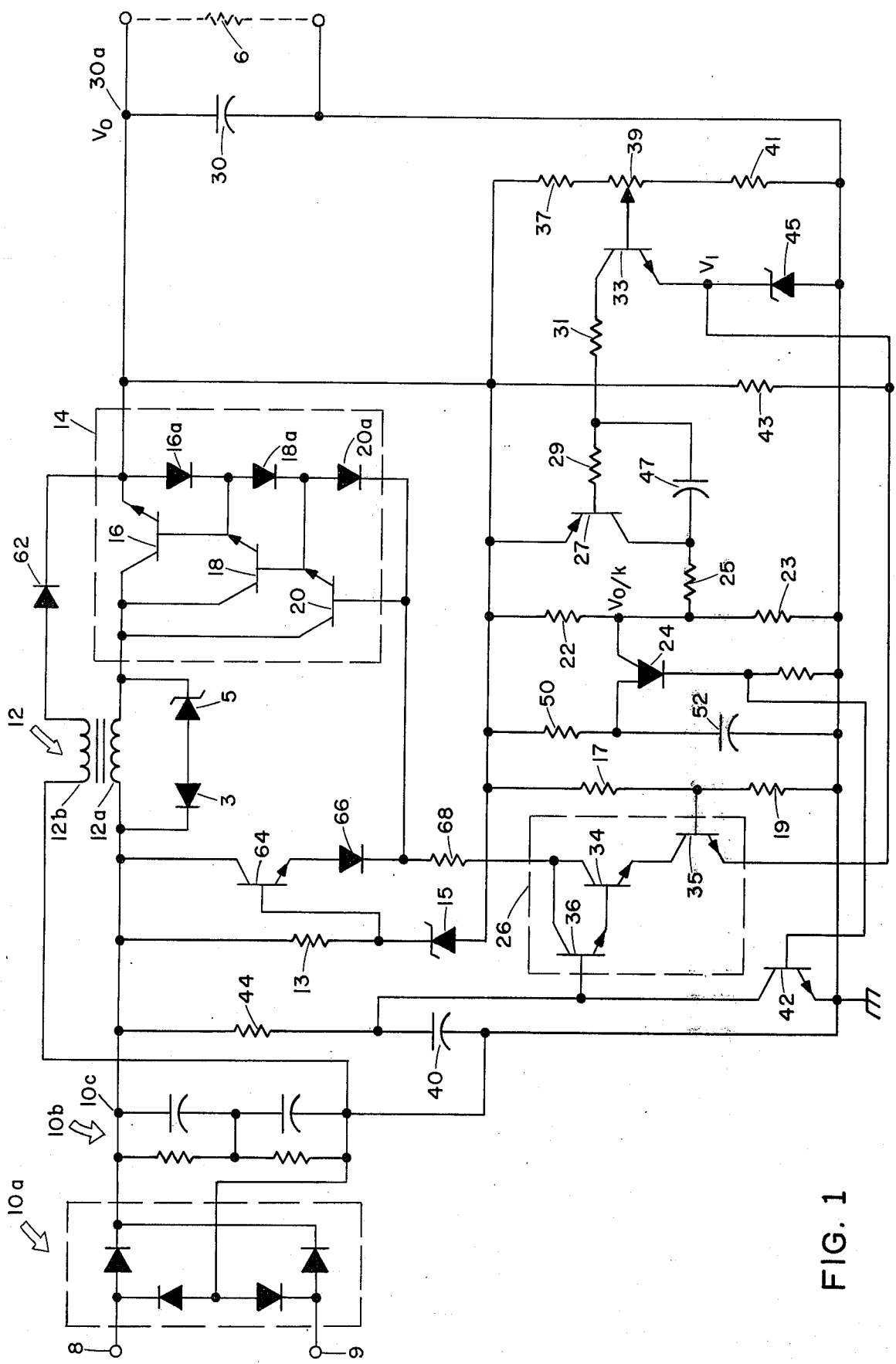
FIG. 1 is a schematic circuit diagram of an embodiment of the invention.

Refer to FIG. 1 which is a schematic of the invention wherein an input voltage which can either be a.c. or d.c. and can vary over an extremely wide range is obtained from an unregulated voltage supply and impressed at terminals 8 and 9 across a rectifier comprised of the diode section 10a and a filter section 10b. The resulting rectified voltage at terminal 10c is connected through a primary winding 12a of transformer 12 and switch 14 to an output terminal 30a which comprises one plate of capacitor 30. A load illustrated as resistor 6 is connectable across the output terminals, that is across capacitor 30. Primary winding 12a and capacitor 30 comprise a low pass filter. The transformer secondary winding 12b is coupled to output terminal 30a through a diode 62. Diode 3 and Zener diode 5 connected back to back across primary winding 12a are provided for transient suppression as will become clear as this description proceeds.

Switching means 14 is comprised of NPN transistors 16, 18 and 20 connected in a triple Darlington configuration having commonly connected collector electrodes connected to primary winding 12a and with the emitter electrodes of transistors 18 and 20 connected respectively to the base electrodes of transistors 16 and 18. The emitter electrode of transistor 16 is connected to output terminal 30a. The base electrode of transistor 20 is connected through resistor 68 to the collector electrodes of NPN transistors 34 and 36 connected as a Darlington pair. The base electrode of transistor 36 is connected to the charge storage circuit comprised of capacitor 40 connected between the base electrode of transistor 36 and a common terminal such as ground and resistor 44 connected serially with capacitor 40 to terminal 10c. NPN transistor 42 has its collector-emitter circuit arranged in shunt relationship with capacitor 40 and its base electrode connected to the cathode of unijunction 24. The unijunction control electrode is connected into the voltage divider comprised of resistors 22 and 23 connected across capacitor 30. The unijunction control electrode is connected through resistor 25 to the collector electrode of PNP transistor 27 whose emitter electrode is connected to terminal 30a. The base electrode of transistor 27 is connected through the serial arrangement of resistors 29 and 31 to the collector electrode of NPN transistor 33 whose base electrode is connected to the arm of potentiometer 39 which is connected with resistors 37 and 41 as a voltage divider across capacitor 30. As will be explained below adjustment of the voltage at the base electrode of transistor 33 by manipulation of potentiometer 39 will change the regulated voltage across capacitor 30. A Zener diode connected between the emitter electrode of transistor 33 and ground together with resistor 43 connected in series with Zener diode 45 across capacitor 30 provides a reference voltage level at the emitter electrodes of transistors 33 and 35.

A voltage divider comprised of resistors 17 and 19 is connected across capacitor 30 with the base electrode of transistor 35 connected therebetween. This provides a relatively constant current drive into the base of transistor 35. Transistor 35 together with transistors 34 and 36 comprise a comparator 26 which compares the voltage across capacitor 40 with the reference voltage at the emitter of transistor 35 which may be designated $V_1$.

Figure 2:
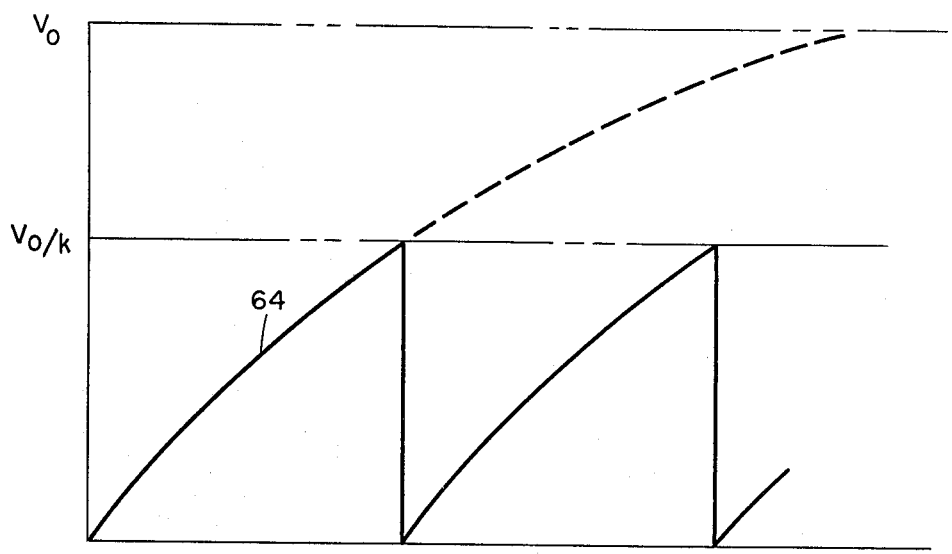
FIG. 2 illustrates wave forms of the various charge storage circuits of the device of FIG. 1 and is helpful in explaining the operation of the invention.
Figure 2:
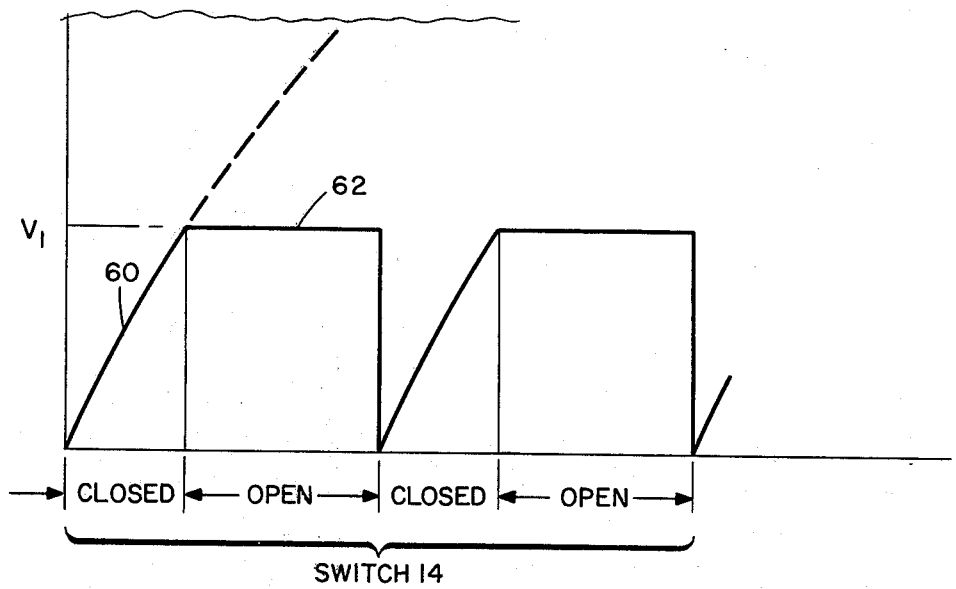

For an explanation of the operation of the circuit of FIG. 1 refer now to FIG. 2. As mentioned, comparator 26 compares the voltage across capacitor 40 against the reference voltage level $V_1$. So long as the voltage across capacitor 40 is below $V_1$ (ignoring the base emitter voltage drops of transistors 34 and 36) the comparator remains nonconductive so that no current is drawn through resistor 68 causing transistors 16, 18 and 20 to be forward biased by the current from diode 66 thus closing switch 14 to communicate terminal 10c to terminal 30a through primary winding 12a. Assuming the collector emitter circuit of transistor 42 to be nonconductive, capacitor 40 is charged through resistor 44 from terminal 10c, that is from the unregulated input voltage terminal. In FIG. 2 curve 60 illustrates the exponentially increasing voltage across capacitor 40 from some base voltage level towards the voltage level at terminal 10c. When the voltage on capacitor 40 reaches $V_1$ comparator 26 conducts to maintain that level (curve 62 of FIG. 2) thus drawing the current from diode 66 into the through the comparator. This deprives switch 14 of its drive current and the switch opens. Switch 14 remains open until capacitor 40 is discharged below the $V_1$ level by transistor 42, as will be explained below.

Capacitor 52 receives charges through resistor 50 from terminal 30a so as to charge from a predetermined level toward the regulated voltage level, hereafter termed $V_0$. The charging of capacitor 52 is illustrated by curve 64 of FIG. 2. When the voltage level on capacitor 52 reaches the firing potential of unijunction 24 as determined by the potential at its control electrode, and hereafter termed $V_0/k$, the unijunction fires to discharge capacitor 52 to its base level and to simultaneously provide drive current to transistor 42, thereby rendering that transistor conductive to discharge capacitor 40 to its base level. Immediately thereafter capacitors 40 and 52 again begin to charge as illustrated at FIG. 2.

It can be seen that the triggering level of unijunction 24 depends on the voltage level at its control electrode which is determined by $V_0$, the voltage divider comprised of resistors 22 and 23, and the effect of transistors 27 and 33. This latter effect can be varied by adjustment of potentiometer 39. This will act to increase or decrease $V_0/k$, as selected, resulting in, respectively, a slower frequency of operation and a greater percentage OPEN time of switch 14, or a faster frequency of operation and greater percentage CLOSED time of switch 1. This, of course, will result in a lower or higher regulated voltage level respectively.

Comparator 26 is useful during initial start-up of the voltage regulator before any charges have accumulated on capacitor 30. Since at that time the output voltage is zero there will be no drive for unijunction 24. The unijunction thus cannot fire and will tend to hold switch 14 open. However, with no output voltage transistor 35 is maintained nonconductive causing the current from diode 66 to close switch 14 to start up the regulator. Switch 14 will be held closed by this means until sufficient voltage has been built across capacitor 30 to fire the unijunction.

Transistors 27 and 33 are also helpful during the latter stages of initial start up of the voltage regulator, that is, after unijunction is operating but before steady state conditions are achieved. During that time, the voltage across capacitor 30 is relatively low, having not built up to the desired level, with the result that $V_0/k$ is depressed so that unijunction will normally fire at an abnormally high rate. Transistors 27 and 33 cause $V_0/k$ to build up more rapidly than otherwise so that unijunction 24 quickly attains its normal operating firing frequency. Capacitor 47 connected in the base-collector circuit of transistor 47 is a filter which prevents wide swings in the $V_0/k$ level due to transients.

As previously stated, drive current for switch 14 is obtained from diode 66. This diode together with transistor 64, resistor 13 and Zener diode 15 comprise a constant current source providing a well regulated drive current as the circuit input voltage varies over a wide range. Diodes 16a, 18a and 20a are back biased when switch 14 is closed by the switch drive current. When the switch drive current is diverted into comparator 26, opening switch 14, these diodes become conductive to bias transistors 16, 18 and 20 further nonconductive thus ensuring the switch will not leak current even with a high voltage drop thereacross.

Returning to FIG. 2 is can be seen that the trigger point of unijunction 24 will move up and down curve 64 if $V_0$, the regulated voltage, should change. For example, if the regulated voltage should tend to drop the switch 14 open time would decrease thus tending to restore the regulated voltage to its desired value. This decrease in the switch 14 open time, while its closed time remains constant, results in an increase in the operating frequency of the switch. On the other hand, as the regulated voltage tends to increase switch 14 open time increases holding the regulated voltage as its desired value by decreasing the operating frequency of switch 14.

In the case where the input unregulated voltage changes, the slope of curve 60 will change to thus alter the switch 14 duty cycle. Specifically, if the unregulated voltage increases the slope of curve 60 will increase thus decreasing the time for the voltage across capacitor 40 to each the $V_1$ reference level. This, of course, will decrease the percentage time switch 14 is closed. If the unregulated input voltage should drop the slope of curve 60 will decrease so that the voltage across capacitor 40 will reach the $V_1$ reference level in a relatively longer time, thus maintaining switch 14 closed for a longer period. In any event, the result will be to maintain the regulated voltage at the desired level.

It should also be noted that capacitor 30 is charged not only through switch 14, but also through transformer 12 when switch 14 opens. This is caused by the current decay in primary winding 12a which induces a current in secondary winding 12b through diode 62 into capacitor 30, thus dumping the energy stored in the transformer into capacitor 30. A similar but opposite current is induced in the transformer secondary winding 12b when switch 14 closes, however, this current back biases diode 62 and thus has no effect on the voltage or charge at capacitor 30. In this regard, note that transformer 12 is primarily an energy storage device and does not generally perform as a transformer except in response to the transients caused by the operation of switch 14. Of course, as previously mentioned, winding 12a together with capacitor 30 comprises a low filter.

The invention claimed is:

1. A voltage regulator circuit comprising: a pair of input terminals between which an unregulated voltage is applied, and a pair of output terminals across which a regulated voltage is generated; a capacitive reactance connected across said output terminals; an inductive reactor; switch means serially connected with said inductive reactor between a first of said input terminals and a first of said output terminals; a source of a reference voltage level; means for generating a ramping voltage signal on a slope determined by the level of said unregulated voltage; means for controlling said switch means in accordance with the level of said ramping voltage signal with respect to said reference voltage level; means for returning said ramping voltage signal to a base level when triggered; means for generating a second ramping voltage signal on a slope determined by said regulated voltage; and, means responsive to said second ramping voltage signal and said regulated voltage for triggering said means for returning.

2. The voltage regulator circuit of claim 1 wherein said inductive reactor comprises the primary winding of a transformer, the secondary winding of said transformer being connected to deliver current to said capacitor when said switch means opens.

3. The voltage regulator circuit of claim 1 wherein said means for generating a ramping voltage signal comprises a charge storage circuit comprising resistance and capacitive means serially connected with one another across said source of unregulated voltage.

* * * * *